(12) United States Patent
Clyatt, III et al.

(10) Patent No.: US 12,051,881 B2
(45) Date of Patent: Jul. 30, 2024

(54) CONNECTOR WITH LINEAR COAXIAL, RIGHT ANGLE COAXIAL AND OPTICAL CONNECTORS

(71) Applicant: Samtec, Inc., New Albany, IN (US)

(72) Inventors: Clarence L. Clyatt, III, Goodyear, AZ (US); John A Mongold, Todd, PA (US); Jonathan E. Buck, Hershey, PA (US); Andrew Woodson, New Albany, IN (US); Jason Ruzzi, New Albany, IN (US)

(73) Assignee: SAMTEC, INC., New Albany, IN (US)

( * ) Notice: Subject to any disclaimer, the term of this patent is extended or adjusted under 35 U.S.C. 154(b) by 37 days.

(21) Appl. No.: 17/689,179

(22) Filed: Mar. 8, 2022

(65) Prior Publication Data

US 2022/0285861 A1  Sep. 8, 2022

Related U.S. Application Data

(60) Provisional application No. 63/211,053, filed on Jun. 16, 2021, provisional application No. 63/210,928, filed on Jun. 15, 2021, provisional application No. 63/195,486, filed on Jun. 1, 2021, provisional application No. 63/157,951, filed on Mar. 8, 2021.

(51) Int. Cl.
| | |
|---|---|
| *H01R 9/05* | (2006.01) |
| *H01R 12/70* | (2011.01) |
| *H01R 13/514* | (2006.01) |
| *H01R 13/631* | (2006.01) |
| *H01R 24/44* | (2011.01) |

(52) U.S. Cl.
CPC ............ *H01R 9/05* (2013.01); *H01R 12/7082* (2013.01); *H01R 13/514* (2013.01); *H01R 13/6315* (2013.01); *H01R 24/44* (2013.01)

(58) Field of Classification Search
CPC .......... H01R 24/50; H01R 9/05; H01R 24/44; H01R 13/6315; H01R 13/514; H01R 12/7082; H01R 12/7052; G02B 6/3817; G02B 6/3885
See application file for complete search history.

(56) References Cited

U.S. PATENT DOCUMENTS

| | | | |
|---|---|---|---|
| 3,205,471 A | 9/1965 | Herrmann | |
| 5,007,860 A * | 4/1991 | Robinson | H01R 24/525 D13/133 |
| 6,162,089 A | 12/2000 | Costello et al. | |
| 6,830,486 B2 * | 12/2004 | Norris | H01R 13/514 439/669 |
| 8,715,016 B2 * | 5/2014 | DeBock | H01R 13/514 439/701 |
| 9,507,098 B2 | 11/2016 | Fabian et al. | |

(Continued)

FOREIGN PATENT DOCUMENTS

| | | |
|---|---|---|
| WO | 2020/185816 A1 | 9/2020 |
| WO | 2022/015828 A1 | 1/2022 |

OTHER PUBLICATIONS

CN-111786199-A w/ translation (Year: 2020).*

*Primary Examiner* — Marcus E Harcum
(74) *Attorney, Agent, or Firm* — BakerHostetler

(57) ABSTRACT

Modular block type of board connector having two different types of RF connectors and an optical cable with an optical connector. A RF connector with built-in impedance tuning and automatic biasing.

26 Claims, 16 Drawing Sheets

(56) References Cited

U.S. PATENT DOCUMENTS

| | | | |
|---|---|---|---|
| 9,735,519 B2 | 8/2017 | Yi et al. | |
| 9,843,148 B2 | 12/2017 | Little et al. | |
| 10,116,027 B2 | 10/2018 | Park et al. | |
| 10,498,061 B1* | 12/2019 | Blasick | H05K 7/1454 |
| 10,709,011 B2* | 7/2020 | Trulli | H01R 9/0515 |
| 10,879,654 B2* | 12/2020 | Graβl | H01R 24/44 |
| 11,239,616 B2* | 2/2022 | Park | H01R 13/6588 |
| 2002/0142650 A1* | 10/2002 | Clark | H01R 27/02 |
| | | | 439/536 |
| 2003/0096531 A1* | 5/2003 | Taylor | H01R 4/04 |
| | | | 439/540.1 |
| 2018/0366843 A1* | 12/2018 | Maki | H01R 24/42 |
| 2019/0227245 A1* | 7/2019 | Miller | G02B 6/3817 |
| 2019/0229476 A1* | 7/2019 | Miller | H01R 9/0527 |
| 2020/0274298 A1* | 8/2020 | Hashimoto | H01R 13/6594 |
| 2021/0066853 A1* | 3/2021 | Miller | H01R 13/516 |
| 2021/0185842 A1* | 6/2021 | Eusterholz | H01R 13/514 |

* cited by examiner

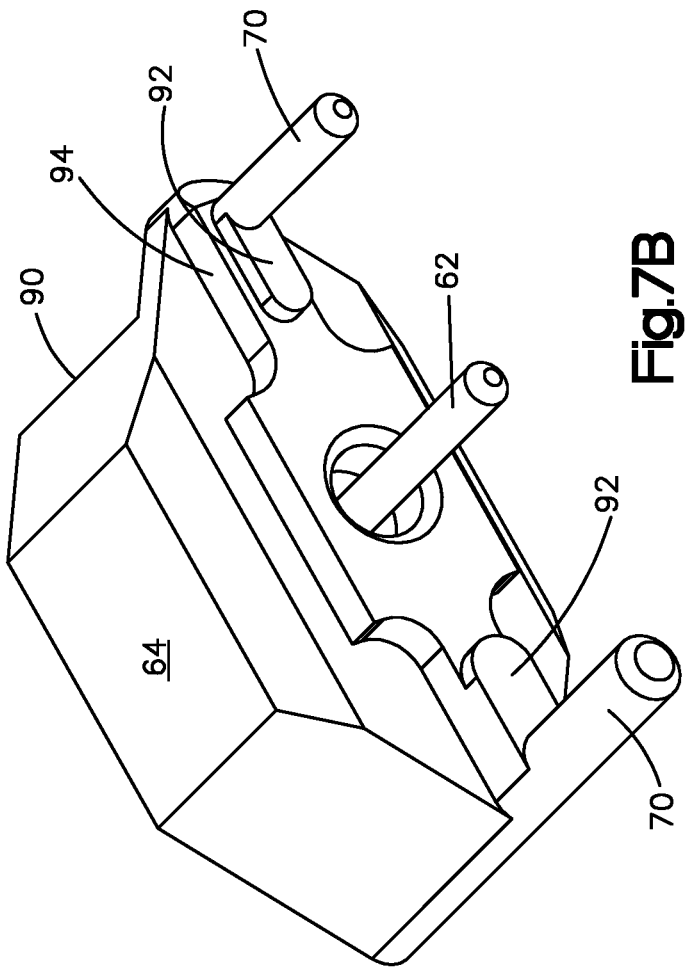
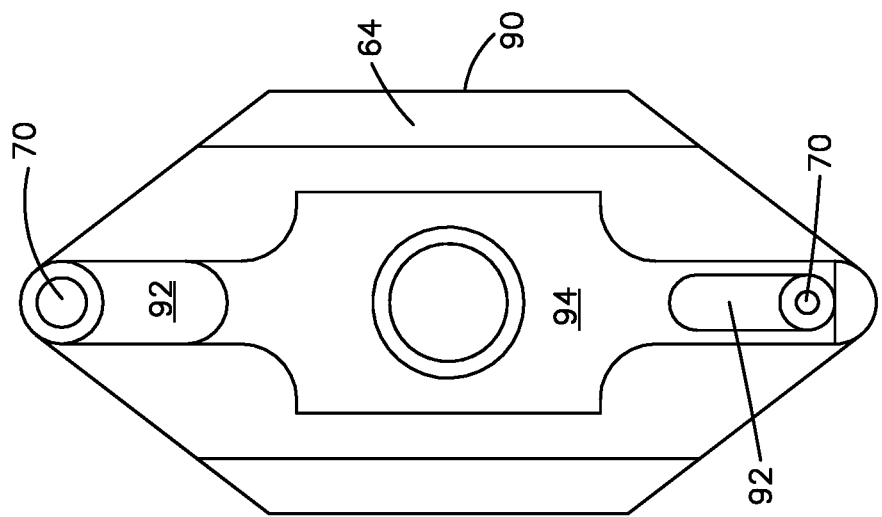
Fig.7B
Fig.7A

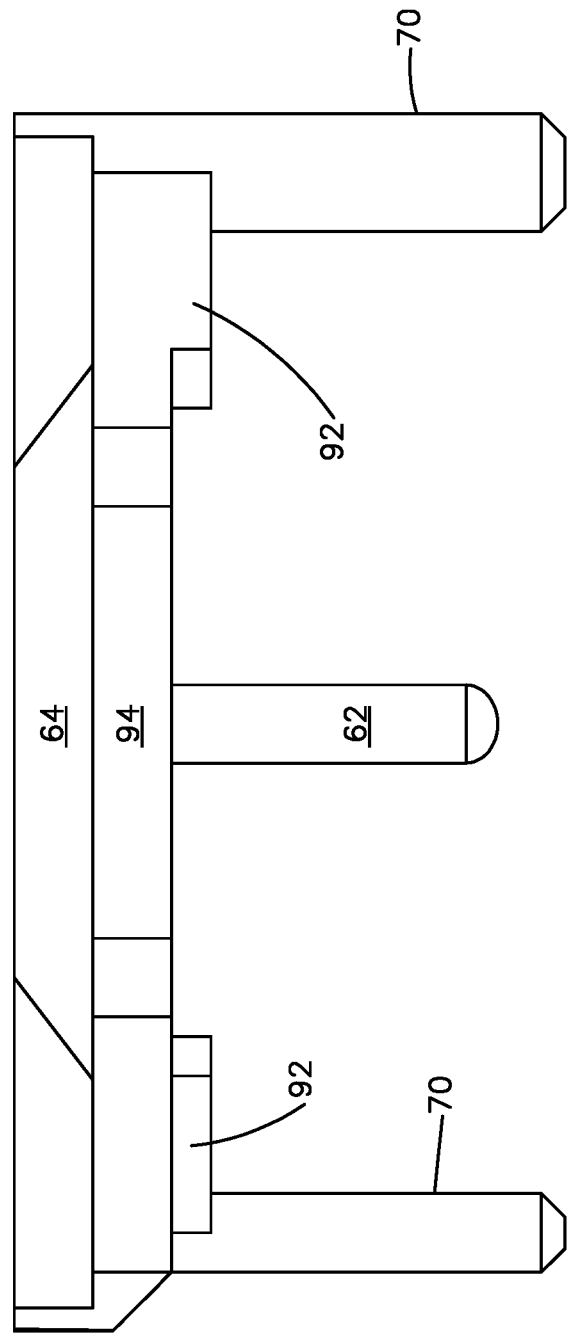

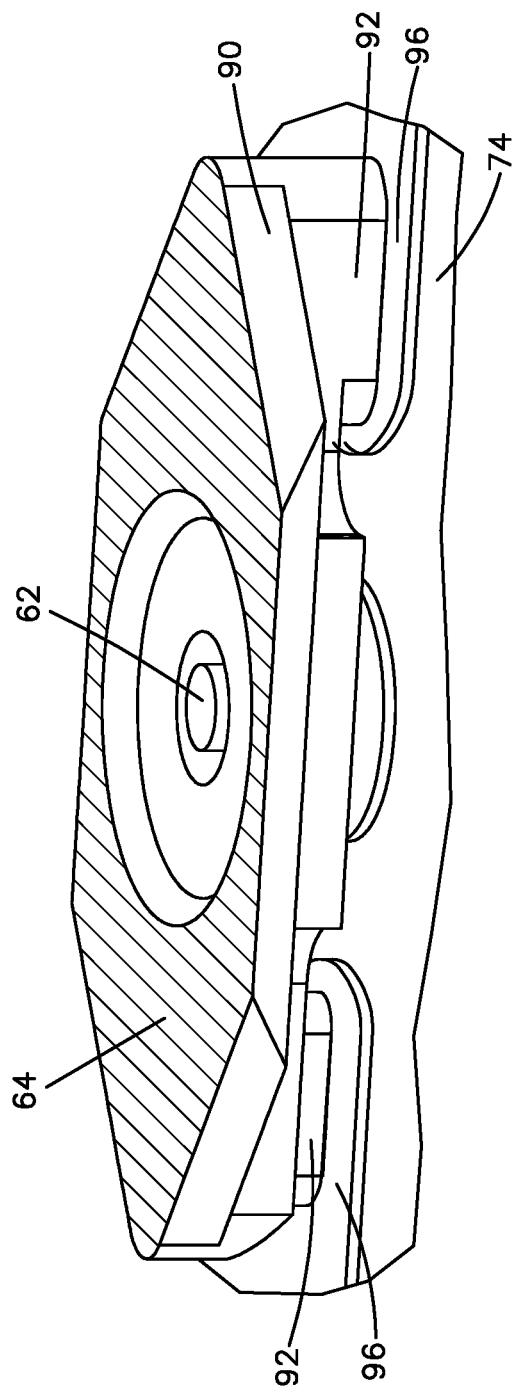

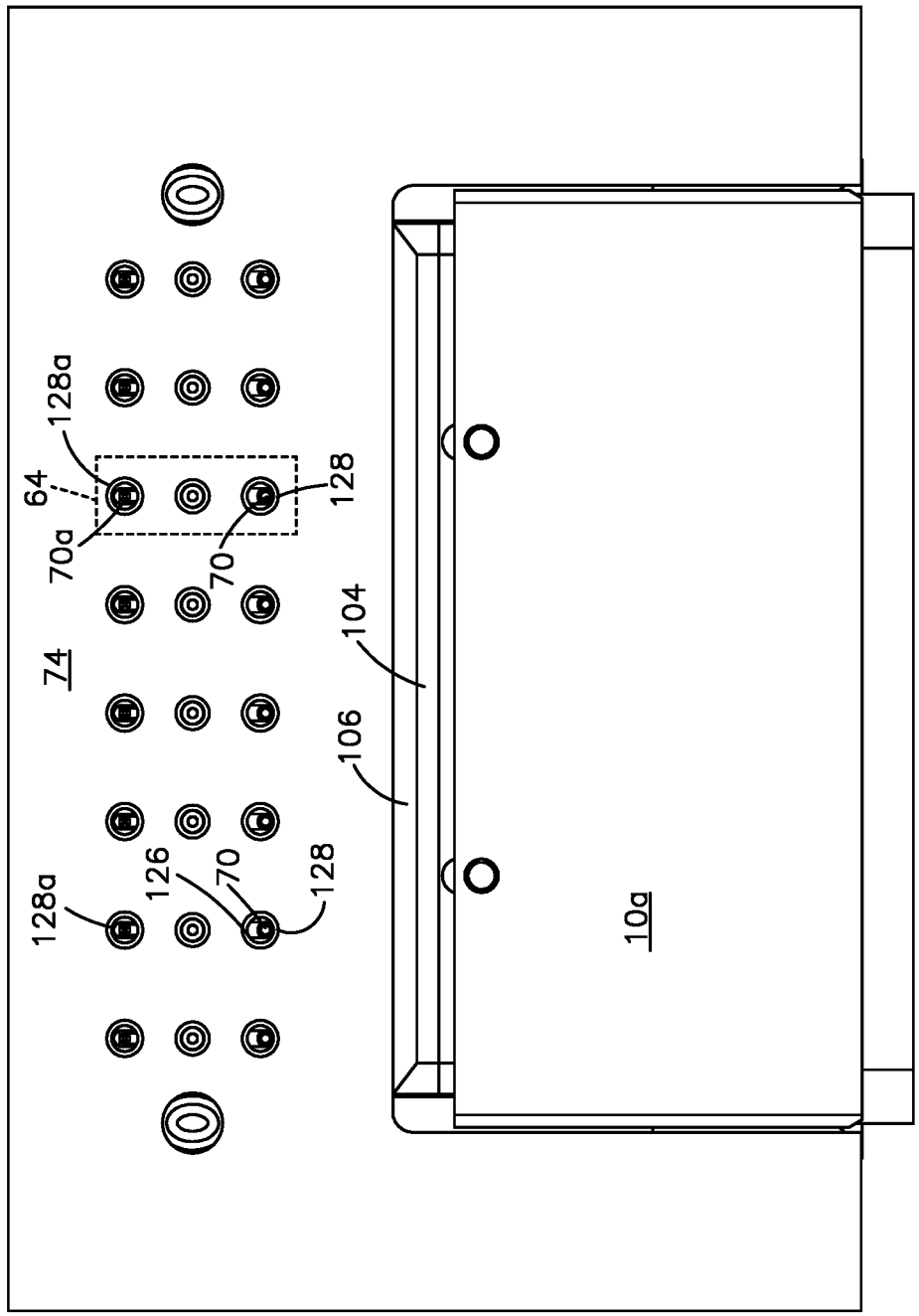

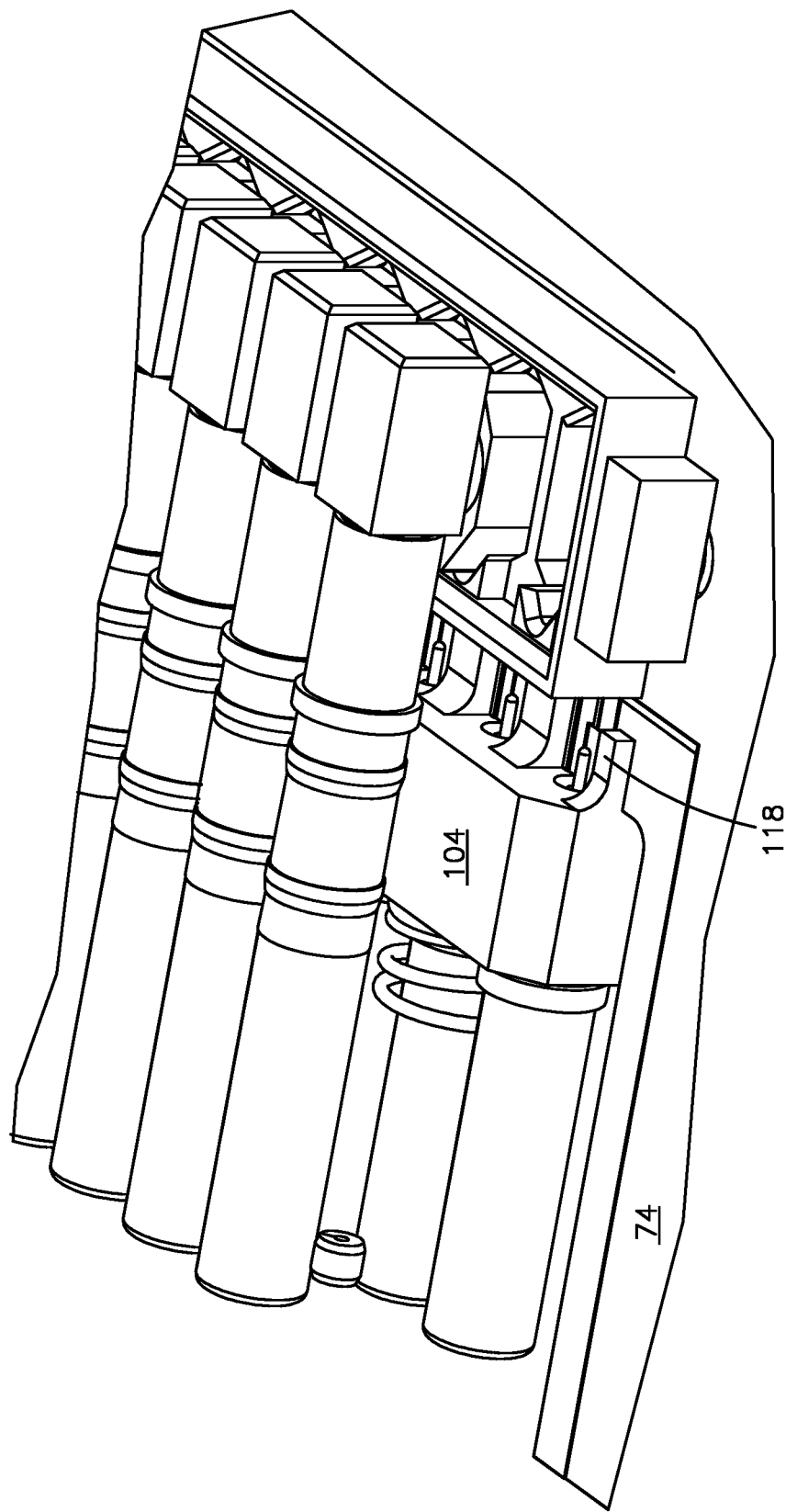

CONNECTOR WITH LINEAR COAXIAL, RIGHT ANGLE COAXIAL AND OPTICAL CONNECTORS

CROSS-REFERENCE TO RELATED APPLICATIONS

This claims the benefit of U.S. Patent Application Ser. No. 63/157,951 filed Mar. 8, 2021, U.S. Patent Application Ser. No. 63/195,486 filed Jun. 1, 2021, U.S. Patent Application Ser. No. 63/210,928 filed Jun. 15, 2021, and U.S. Patent Application Ser. No. 63/211,053 filed Jun. 16, 2021, the disclosure of each of which is hereby incorporated by reference as if set forth in its entirety herein.

TECHNICAL FIELD

Embodiments described below generally relate to radio frequency (RF) or coaxial connectors, alone or in combination with a removable optical cable connector and its associated optical cables.

BACKGROUND

U.S. Pat. No. 3,205,471 discloses inserting clips (16) into an elongate mounting block (12) in an alternately opposed and inverted relationship. U.S. Pat. No. 3,205,471 is hereby incorporated by reference as if set forth in its entirety herein.

U.S. Pat. No. 6,162,089 discloses two different types of connectors carried by a single housing (50). U.S. Pat. No. 6,162,089 is hereby incorporated by reference as if set forth in its entirety herein.

U.S. Pat. No. 9,507,098 discloses a multi-fiber connector with ferrule float. U.S. Pat. No. 9,507,098 is hereby incorporated by reference as if set forth in its entirety herein.

U.S. Pat. No. 9,735,519 discloses a coaxial connector assembly having a plurality of coaxial contacts. U.S. Pat. No. 9,735,519 is hereby incorporated by reference as if set forth in its entirety herein.

U.S. Pat. No. 9,843,148 discloses a right angle, straddle mount connector. A first row of conductors are through hole mounted. A second row are surface mounted using surface mount technology (SMT). The through hole mounts are closer, in length, to a mating end of the right angle, straddle mount connector than the SMTs. Three sets of hold downs/board locks include a pair of posts defined by housing (52), mounting legs (55), and mounting legs (544). U.S. Pat. No. 9,843,148 is hereby incorporated by reference as if set forth in its entirety herein.

U.S. Pat. No. 10,116,027 discloses using turning screws to adjust resonance frequency. U.S. Pat. No. 10,116,027 is hereby incorporated by reference as if set forth in its entirety herein.

Patent Cooperation Treaty Publication WO2022/015828, entitled Floating Data Communications Module, published 20 Jan. 2022 is hereby incorporated by reference in its entirety.

Patent Cooperation Treaty Publication WO2020185816, entitled Impedance Controlled Electrical Contact, published 17 Sep. 2020 is hereby incorporated by reference in its entirety.

SUMMARY

The present disclosure includes an electrical-optical connector that has a combination of non-board penetrating surface mount tabs and board penetrating through hole or press-fit mount pegs. The surface mount tabs are positioned closer, in distance, to a connector body than the through hole or press-fit mount pegs. Without being bounded by theory, this arrangement allows the connector to be mounted to a substrate and the connector or connector body can be devoid of substrate crowding alignment pegs or hold downs or board locks or connector mounts.

A combined RF and optical connector can include a connector body having a first side and a second side. The second side can define a hollow extension that is fluidly connected to a connector orifice defined by the first side. The hollow extension can be configured to receive a removable or integral optical cable connector. The first side and the second side can each define at least one first RF connector orifice or linearly aligned first RF connector orifices and the first side and the second side can each define at least one second RF connector orifice or linearly aligned second RF connector orifices. A first RF connector can be inserted in the at least one first RF connector orifice from first side of the connector body, in a direction toward the opposed second side of the connector body. A second RF connector can be inserted in the at least one second RF connector orifice from the second side of the connector body, in a direction toward the opposed second side of the connector body. Respective protrusions can each extend from the connector body and alternate along a common line along the second side of the connector body. The second side can define at least one third RF connector orifice.

The first RF connector can include a first RF connector conductor. The first RF connector conductor can include a first RF connector conductor mate end and a first RF connector conductor mount end. The first RF connector conductor mount end can define a surface mount tab. The first RF connector conductor can extend along a line for a substantial length or an entire length of the first RF connector conductor. The second RF connector can include or also include a second RF connector conductor. The second RF connector conductor can include a second RF connector conductor mate end and a second RF connector conductor mount end. The second RF connector conductor can bend at an angle at a location along its entire length.

The at least one first RF connector can include a first RF ground structure. The first RF ground structure can encircle or surround a majority length of the first RF connector conductor. The at least one second RF connector can further include a second RF ground structure. The second RF ground structure can encircle or surround a majority length of the second RF connector conductor. The second RF connector further can include or define one or more through hole mount pegs, such as at least two through hole mount pegs.

A connector can include a connector body having a first side and a second side. The second side can define a hollow extension that can be fluidly connected to a connector orifice defined by the first side. The hollow extension can be attached to the second side of the connector body and can be configured to receive an optical cable connector. The second side can also define at least two protrusions. The first side and the second side can each define at least one first RF connector orifice, such as linearly aligned first RF connector orifices. The first side and the second side can each define at least one second RF connector orifice, such as linearly aligned second RF connector orifices.

A first RF connector can be inserted in the at least one first RF connector orifice from a first side of the connector body, in a direction toward the opposed second side of the connector body. The first RF connector can have a first RF connector conductor that defines a first RF conductor mate end and a first RF conductor mount end. The first RF connector conductor mount end can have a surface mount tab positioned between the at least two protrusions. A second RF connector can be inserted in the at least one second RF connector orifice from the second side of the connector body, in a direction toward the opposed second side of the connector body.

An electrical connector can include a connector body having a first side, a second side, a third side, a fourth side, a fifth side and a sixth side. The first and second sides can each be opposed from each other and can each be spaced apart from each other. The third and fourth sides can each be opposed from each other and can each be spaced apart from each other. Fifth and sixth sides can each be opposed from each other and can each be spaced apart from each other. Two or more surface mount tabs of a respective RF connector, such as a second RF connector, can be positioned adjacent to both the second and sixth sides. Each of the two or more surface mount tabs can include or define a mounting surface positioned perpendicular to the second side and parallel to the sixth side. Respective ones of the two or more through hole mount pegs or press-fit tails can each be spaced farther from the second side than the mounting surfaces of the two or more surface mount tabs.

A connector body can receive three different connectors, each with a different mounting interface, a different transmission geometry such as cable, linear and right angle, a different physical shape or a different visual appearance.

A connector can include a connector body having a first side and a second side. A first type of connector can be inserted into the connector body from the first side. A second type of connector can be inserted into the connector body from a second side, opposite to the first side. A third type of connector can be inserted into the connector body from the second side, opposite to the first side. The first type of connector can be a first RF connector. The second type of connector can be a second RF connector. The third type of connector can be an optical connector. All three types of connectors can be physically different from one another.

A connector can include a connector body having a first side and a second side. A first type of connector can be inserted into the connector body from the first side. A second type of connector can be inserted into the connector body from a second side, opposite to the first side. A third type of connector can be inserted into the connector body from the second side, opposite to the first side, wherein the first type of connector is a first RF connector that includes a first RF connector conductor. The first RF connector conductor can be a vertical or linear or can be devoid of any bends 30 degrees or greater. The first RF connector conductor can include a first RF connector conductor mate end and a first RF connector conductor mount end. The first RF connector conductor mount end can be positioned between two spaced apart protrusions defined by the second side of connector body. The second type of connector can be is a second RF connector that includes a second RF connector conductor. The second RF connector conductor can define a bend of 45 degrees or greater, such as approximately 90 degrees. The second RF connector conductor can have a second RF connector conductor mate end and a second RF connector conductor mount end. The second RF connector mount end can be spaced farther from the first side than the first RF connector mount end. The third type of connector cam be an optical cable connector, a cabled power connector, a cabled signal conductor, etc.

A right angle connector, such as second RF connector, can operate without significant modes at approximately 50 Ohms, through approximately 110 GHz, by providing additional electrically conductive material at a bend inside a connector ground structure, such as a second ground structure. The additional material can be material left inside the connector ground structure during the making of the connector ground structure.

A RF connector can include a second RF connector ground structure that defines a first hollow tunnel and a second tunnel hollow tunnel that intersect one another at a bend. The second RF connector conductor can extend through each of the first and second hollow tunnels and can be electrically isolated from the first and second hollow tunnels. The second hollow tunnel can define a first diameter. The hollow tunnel can extend only partially across a length of the first diameter. An indention, notch, cutout or recess can be defined at an intersection of the first and second hollow tunnels. The indention, notch, cutout or recess can form a second intersection of the first and second hollow tunnels at a point inside the first and second hollow tunnels. The second intersection can create or provide or carry added material, such as added electrically conductive material, at the second intersection or a bend defined adjacent to the second intersection. The added material can extend into the second RF connector ground structure, bringing the added material specifically, and the second RF connector ground structure generally, physically closer to the second RF connector conductor at the bend. The bend can define a swept or curved bend of approximately ninety degrees. The RF connector can be devoid of a separate turning screw, a separate tuning screw, bellow filter, or resonance elements. Stated another way, the RF connector, such as second RF connector, does not require manual tuning.

A RF connector can include a second RF connector ground structure that defines a first hollow tunnel and a second tunnel hollow tunnel. A first hollow tunnel end of the first hollow tunnel and a second end of the second hollow tunnel can intersect one another adjacent to an angled transition region that can be defined by a first surface inside the first and second hollow tunnels and an internal, right angled region that can be defined by a second surface inside the first and second hollow tunnels. Additional material, such as additional electrically conductive material, can be formed in a general region of the internal, angled transition region, opposite to the internal, right angled region. A second RF connector conductor can extends through each of the first and second hollow tunnels. The second RF connector conductor can define a curved bend or a swept bend or a radiused bend of approximately 90 degrees. The first and second hollow tunnels can, at an intersection of the first and second hollow tunnels, define a curved bend or a swept bend or a radiused bend of approximately 90 degrees.

The angled transition region can define a second angle θ2 of approximately forty-five degrees with respect to one or both of the first and second hollow tunnels. The additional electrical material can extend or stalactite or protrude from the second RF connector ground structure. The additional electrically conductive material can act as or form an extender, positioning or providing more additional material of the second RF connector conductor physically closer to the second RF connector conductor in the vicinity of a bend defined at the intersection of the first hollow tube and the second hollow tube. The second RF connector can successfully operate without significant unwanted or resonance modes, at approximately 50 Ohms through approximately 110 GHz, without or devoid of a separate turning screw, tuning screw, bellow filter, or resonance elements.

The above and other features, elements, characteristics, steps, and advantages of the present invention will become more apparent from the following detailed description of the embodiments of the present invention with reference to the attached drawings.

BRIEF DESCRIPTION OF DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 7A is a bottom view of the second RF ground structure mounting end shown in FIG. 6.

FIG. 7B is a perspective bottom view of the second RF ground structure mounting end shown in FIGS. 6 and 7A.

FIG. 8 is a side view of the second RF ground structure mounting end shown in FIGS. 6 and 7A-7B.

FIG. 9 is perspective side view of the second RF ground structure mounting end shown in FIGS. 6-8.

FIG. 15 is a bottom perspective view of FIG. 12.

FIG. 16 is a top perspective view of a bias block attached to a substrate.

DETAILED DESCRIPTION

Figure 1:
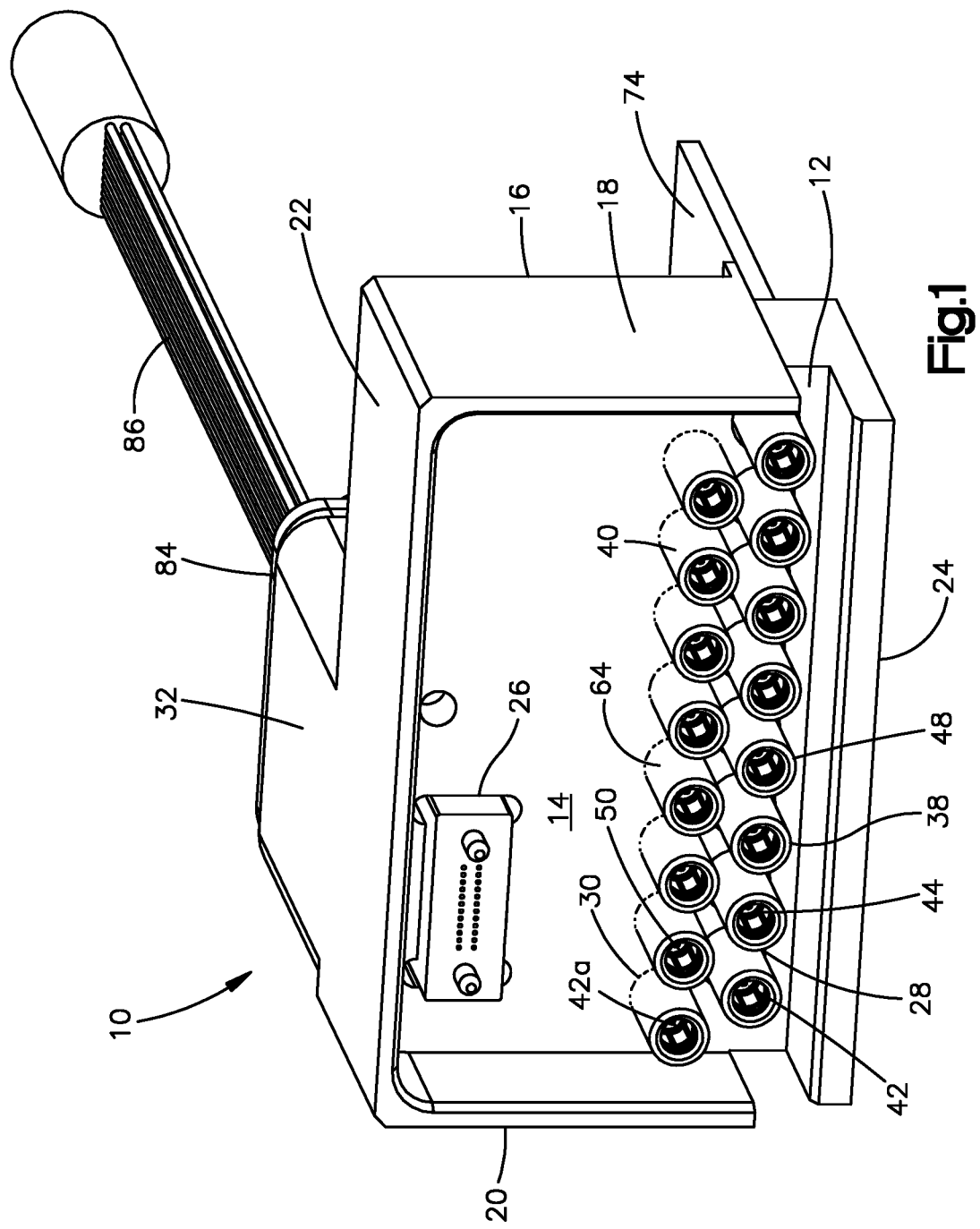
FIG. 1 is a perspective front view of a connector.

A connector 10 of FIG. 1 can include a connector body 12 having a first side 14, a second side 16, a third side 18, a fourth side 20, a fifth side 22 and a sixth side 24. Stated another way, the connector body 12 can define at least three, at least four, at least five, or at least six sides. One of the sides, such as a sixth side 24, can be oriented parallel to a substrate 74.

The first and second sides 14, 16 can each be positioned opposite or opposed from each other and can each be spaced apart from one other. The third and fourth sides 18, 20 can each be positioned opposite or opposed from each other and can each be spaced apart from each other. The fifth and sixth sides 22, 24 can each be positioned opposite or opposed from each other and can each be spaced apart from each other. The connector body 12 can be a unity monolithic housing. The connector body 12 can be formed from an electrically dielectric, electrically conductive, or magnetic absorbing material, such as liquid crystal polymer (LPC), metal, or carbon impregnated plastic, respectively.

The second side 16 of the connector body 12 can define a hollow extension 32. The hollow extension 32 can be fluidly connected through the connector body 12 to a connector orifice 26 defined by the first side 14 of the connector body 12. The hollow extension 32 can define an opening configured to removably receive an optical cable connector 34. The optical cable connector 34 can be configured with optical cables 36 that terminate at a first end at the optical cable connector 34. The optical cables 36 can terminate at an opposed second end at another connector (not shown), to compete an optical cable assembly that includes the cable connector 34, the optical cables 36, and the another connector.

The first side 14 and the second side 16 of the connector body can further define at least one first RF connector orifice 28. The first side 14 and the second side 16 can also define at least one second RF connector orifice 30. A first RF connector 38 can be inserted into the at least one first RF connector orifice 28 in a direction from the first side 14 of the connector body 12, in a direction toward the opposed second side 16 of the connector body 12 or in a mating direction of the connector 10 and a mating connector or cable connector. Sixth side 24 can be positioned immediately adjacent to the first RF connector 38. The first RF connector 38 can extend along a line that is parallel to the one of the sides, such as fifth side 22 or sixth side 24, with a first RF connector conductor mount end 46 oriented parallel to the one of the sides, such as the fifth or sixth sides 22, 24.

A second RF connector 40 can be inserted in the at least one second RF connector orifice 30 in a direction from the second side 16 of the connector body toward the opposed first side 14 of the connector body. The second RF connector 40 can be inserted into the connector body 12 is a direction opposite to the insertion direction of the first RF connector 38, and opposite to the mating direction, such as in a direction from the second side 16 to the first side 14 of the connector body 12.

The first RF connector 38 can include a first RF connector conductor 42, and the second RF connector 40 can include a second RF connector conductor 42A. The first RF connector conductor 42 can include a first RF connector conductor mate end 44. The first RF connector conductor 42 can extend along a line for a substantial (at least 90%) length or an entire length of the first RF connector conductor 42. The second RF connector conductor can include a second RF connector conductor mate end 50. The second RF connector conductor 42A can bend at an angle, such as a forty-five degree to ninety-degree angle, at a location along its entire length. The at least one first RF connector 38 can further include a first RF ground structure 48. The first RF ground structure 48 can encircle or surround a majority length of the first RF connector conductor 42. The at least one second RF connector 40 can further include a second RF ground structure 64. The second RF ground structure 64 can encircle or surround a majority length of the second RF connector conductor 42A.

Figure 2:
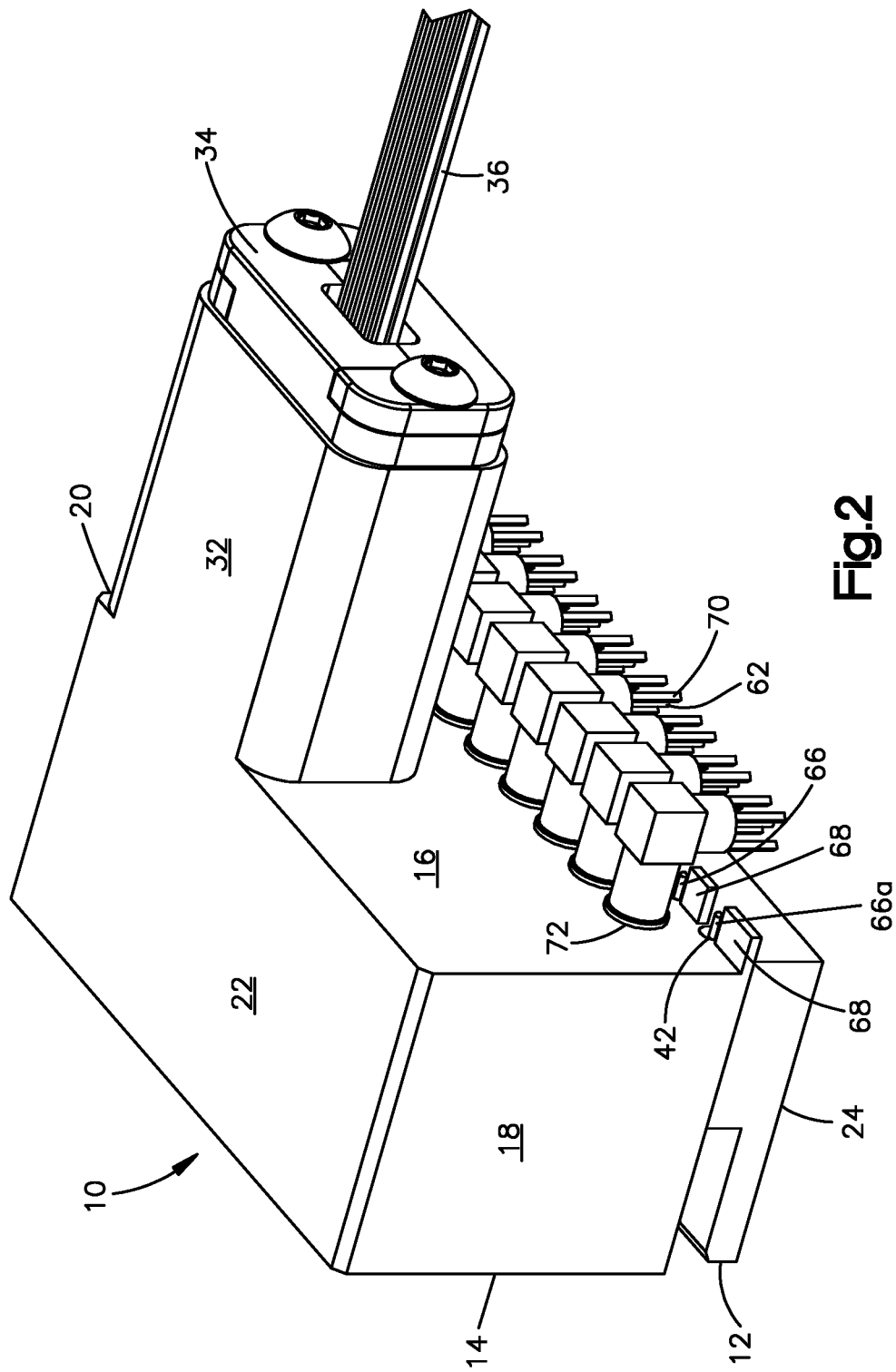
FIG. 2 is a perspective top view of the connector shown in FIG. 1.

As shown in FIG. 2, the connector body 12 of connector 10 can include first, second, third, fourth, fifth and sixth sides 14, 16, 18, 20, 22, 24 and can define a hollow extension 32 configured to receive an optical cable connector 34 carrying optical cables 36. The second side 16 of connector body 12 can define at least two, at least three, at least four, four or more, or a plurality of protrusions 68 that each alternate along a common line along the second side 16 of the connector body 12. Each protrusion 68 can extend in a direction parallel to the first and second sides 14, 16. Connector body 12 can further define at least one third RF connector orifice 72. First RF connector conductor mount end 46 can be positioned between two consecutive protrusions 68. In turn, the first RF connector conductor mount end 46 can define a respective surface mount tab 66 with a mounting surface 66A that is configured to be soldered onto a corresponding signal pad on a substrate. Second RF connector ground structure 64 can further include at least one, at least two, at least three, or at least four through hole mount pegs 70. Second RF connector conductor mount end 62 can be positioned between or inside through hole mount pegs 70. The at least four through hole mount pegs 70 and the second RF connector conductor mount end 62 can each be soldered to a substrate 74. In an alternative embodiment, the through hole mount pegs 70 can be press-fit tails.

Figure 3:
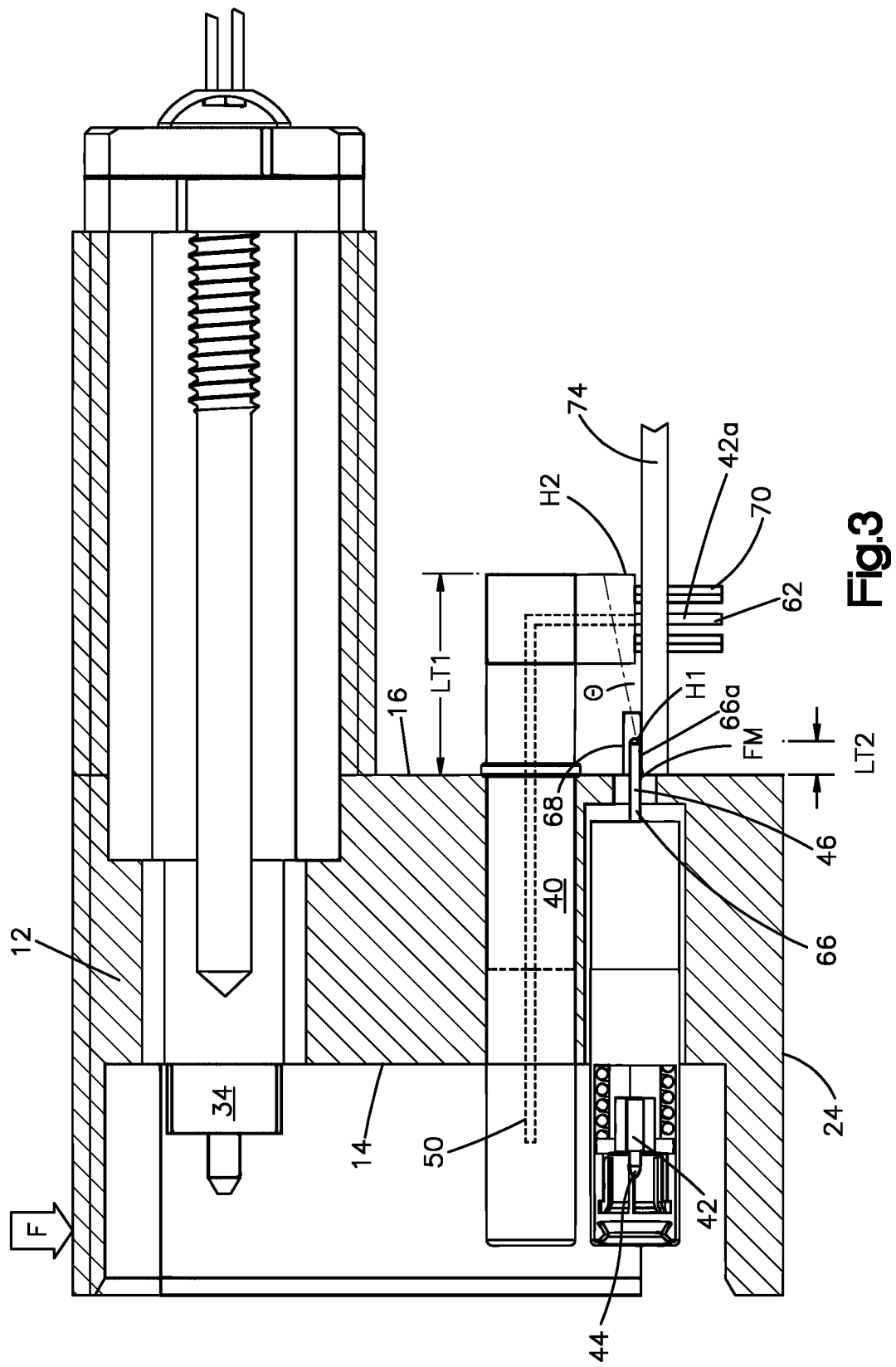
FIG. 3 is a side view of the connector shown in FIGS. 1 and 2.

Moving forward to FIG. 3, the connector 10 can be devoid of reinforcements, such as hold downs, alignment pegs, supports, weld tabs, etc. These features provide mechanical support to SMT joints, but also take up valuable space on a printed circuit board. Without being bound by theory, at least one of the press-fit or through hole mount pegs 70 can positioned first length LT1 from a potential fulcrum FM defined by an intersection of connector body 12 and substrate 74. Mounting surface 66A of surface mounting tab 66A can be positioned or spaced a second length LT2 from fulcrum FM, wherein LT2 is less than LT1. If the connector body 12 experiences an unwanted force shown with respect to force direction F, creating an angle θ, there is less potential linear movement of the surface mounting tab 66A along the first length LT1, expressed as first height H1, than what the through hole mount pegs 70 see along second length LT2, expressed as second height. Expressed in other terms, two or more surface mount tabs 66 can be positioned adjacent to both the second and sixth sides 16, 24, each with a mounting surface 66A positioned perpendicular to the second side 16 and parallel to the sixth side 24. Two or more through hole mount pegs 70 or press-fit tails can be spaced farther from the second side 16 than the mounting surfaces 66A of the two or more surface mount tabs 66.

A first type of connector, such as first RF connector 38 can be inserted into the connector body 12 from one side, such as first side 14. A second type of connector, such as second RF connector 40, can be inserted into the connector body from another side, such as second side 16, opposite to the one side. A third type of connector, such as an optical cable connector 34, can be inserted into the connector body 12 from the another side, such as second side 16 or hollow extension 32 that extends perpendicularly from the second side 16 of the connector body 12. The first type of connector, the second type of connector and the third type of can all be physically or visually different from one another. The first RF connector 38 can be devoid of a bend or a radius bend of approximately thirty degrees or greater. Second RF connector 40 can define a bend or a radiused bend of at least approximately forty-five degrees, including approximately ninety degrees. The third type of connector can be a cable connector, such as an optical cable connector, an electrical power cable connector, or an electrical signal cable connector.

A first type of connector can be inserted into the connector body 12 from the first side 14, a second type of connector inserted into the connector body 12 from a second side 16, opposite to the first side 14, and a third type of connector can be inserted into the connector body 12 from the second side 16, opposite to the first side 14. The first type of connector can be the first RF connector 38 that includes the first RF connector conductor 42. The first RF connector conductor 42 can include the first RF connector conductor mate end 44 and the first RF connector conductor mount end 46. The first RF connector conductor mount end 46 can be positioned between two spaced apart protrusions 68 defined by the second side 16 of connector body 12. The second type of connector can be the second RF connector 40 that includes the second RF connector conductor 42A. The second RF connector conductor 42A can have the second RF connector conductor mate end 50 and the second RF connector conductor mount end 62, where the second RF connector mount end 62 is spaced farther from the first side 14 or the second side 16 than the first RF connector mount end 46. The third type of connector 10 can be the optical cable connector 34.

Figure 4:
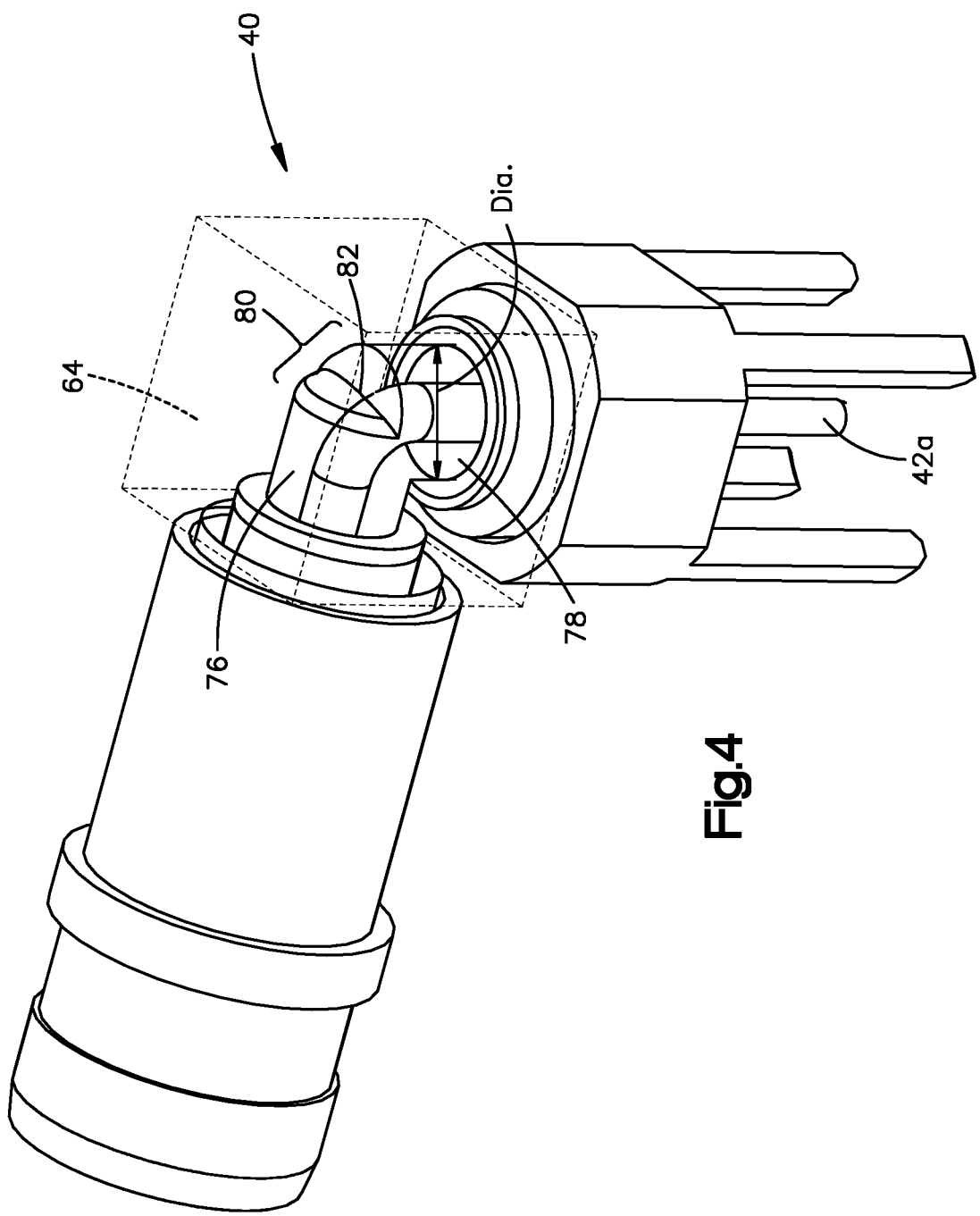
FIG. 4 is a perspective, partial sectional view of a second RF connector shown in FIGS. 1-3.

FIG. 4 discloses a partial sectional view of a connector or RF connector, such as second RF connector 40 that can include a second RF connector ground structure 64. As shown, the second RF connector ground structure 64 can define a first hollow tunnel 76 and a second tunnel hollow tunnel 78. The first hollow tunnel 76 and the second hollow tunnel 78 can intersect one another. For example, a first hollow tunnel end of the first hollow tunnel 76 can intersect a second end of the second hollow tunnel 78. A second RF connector conductor 42A can extend through each of the first and second hollow tunnels 76, 78, and can be electrically isolated from the first and second hollow tunnels 76, 78, such as by dielectric spacers. The second hollow tunnel 78 can define a first exterior diameter DIA, and the first hollow tunnel 76 can extend partially across a length of the first exterior diameter DIA, but perhaps not completely across the full length of the first exterior diameter DIA. Instead, an external indentation, notch, cutout, or recess 80 can be defined adjacent to an external intersection 82 of the first and second hollow tunnels 76, 78.

Figure 5:
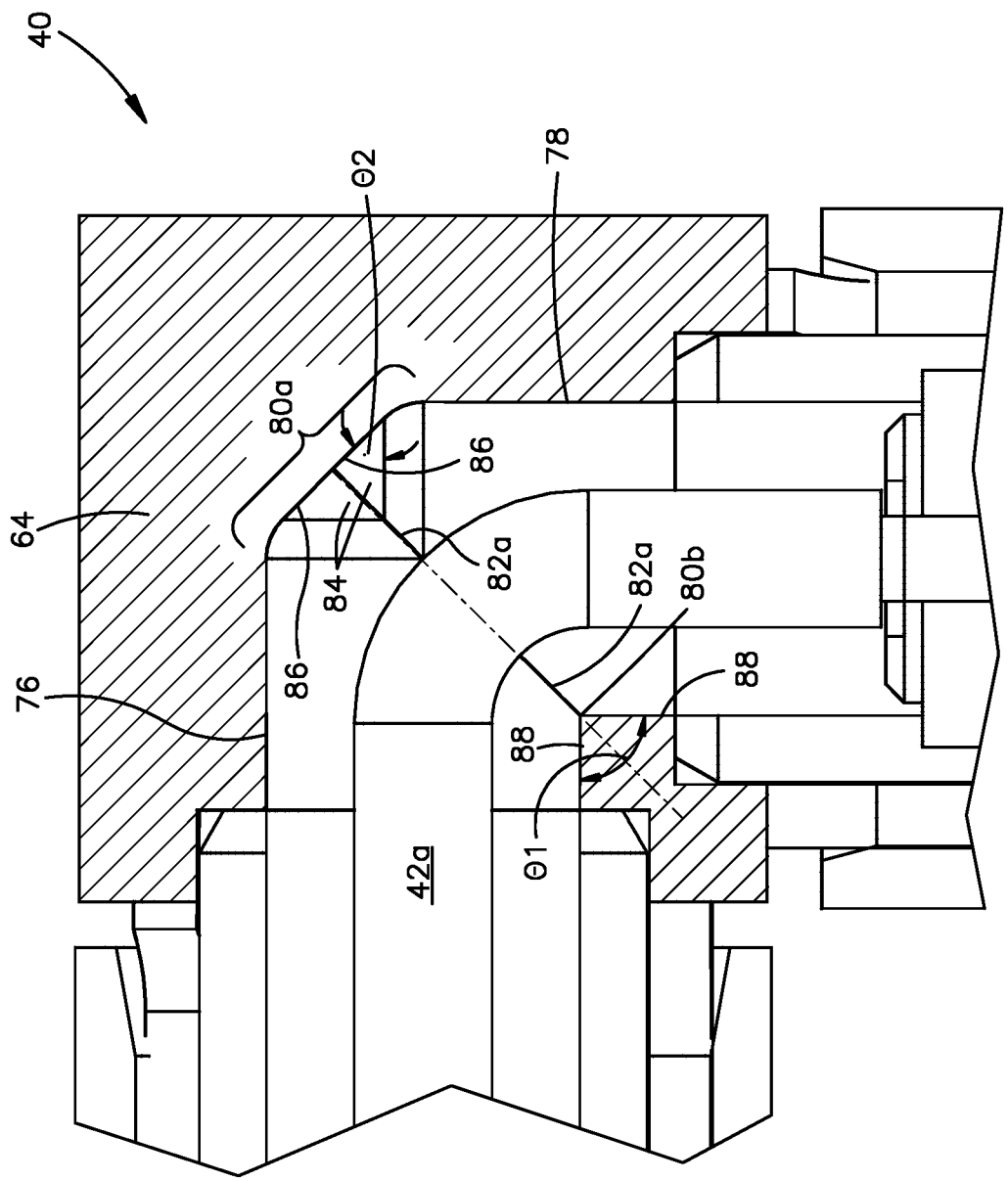
FIG. 5 is a cross-sectional view of a second RF connector shown in FIGS. 1-4.

As shown in FIG. 5, an internal, angled transition region 80A can be defined between the external recess 80 shown in FIG. 4 and an internal, angled region 80B. Stated another way, the internal, angled transition region 80A can be defined by first internal surfaces 86 positioned on opposed sides of the interior intersection of the first and second hollow tunnels 76, 78. The internal, angled region 80B can be defined by second internal surfaces 88 of the first and second hollow tunnels 76, 78, positioned on opposed sides of internal intersection 82A. The internal, angled transition region 80A can define a second angle θ2 of approximately forty-five degrees with respect to one or both of the first and second hollow tunnels 76, 78, or a second angle θ2 that is not approximately 80-110 degrees, such as approximately 45-79 degrees or approximately 45 degrees. The internal, angled region 80B can define a first angle θ1 of approximately 85-95 degrees or approximately ninety degrees. Internal intersection 82A can be a straight line, or can bend or change direction between the internal, angled transition region 80A and the internal, angled region 80B. The interior intersection 82A can intersect the internal, angled region 80B and at least a portion of the internal, angled transition region 80A or at least a portion of a first internal surface 86.

Additional material 84, which can be electrically conductive, can be formed or intentionally left in the general region of the internal, angled transition region 80A, opposite to the internal, angled region 80B, and between the external recess 80 shown in FIG. 4 and the internal, angled region 80B. The additional material 84 can be added or can be integrally formed with a first internal surface 86 portion, and can extend or protrude from the second RF connector ground structure 64 into the first hollow tunnel 76, the second hollow tunnel 78, or both the first and second hollow tunnels 76, 78, in a direction toward the second RF connector conductor 42A. The additional material 84 does not require manual manipulation to rid the second RF connector 40 of unwanted resonances or unwanted modes and can be inaccessible from outside the second RF connector ground structure 64. The additional material 84 can be integrally or separately formed with the second RF connector ground structure 64, and can act as an extender, and provides more electrically conductive material in the vicinity of the bend or internal, angled transition region 80A or a 45-90 degree bend of the second RF connector conductor 42A. The additional material 84 can be electrically connected to the second RF connector conductor 42A, to physically extend the first internal surface 86 physically closer to the second RF connector conductor 42A. This configuration increases capacitance, decreases inductance, decreases reflections, substantially matches impedance of an RF signal that propagates through the first and second hollow tunnels along the second RF connector conductor 42A, and produces a striking improvement is electrical performance. In simulation, second RF connector 40 can successfully operate mode free or effectively mode free at approximately 50 Ohms through 110 GHz without or devoid of a separate turning screw, a tuning screw, bellow filter, or resonance elements.

Figure 6:
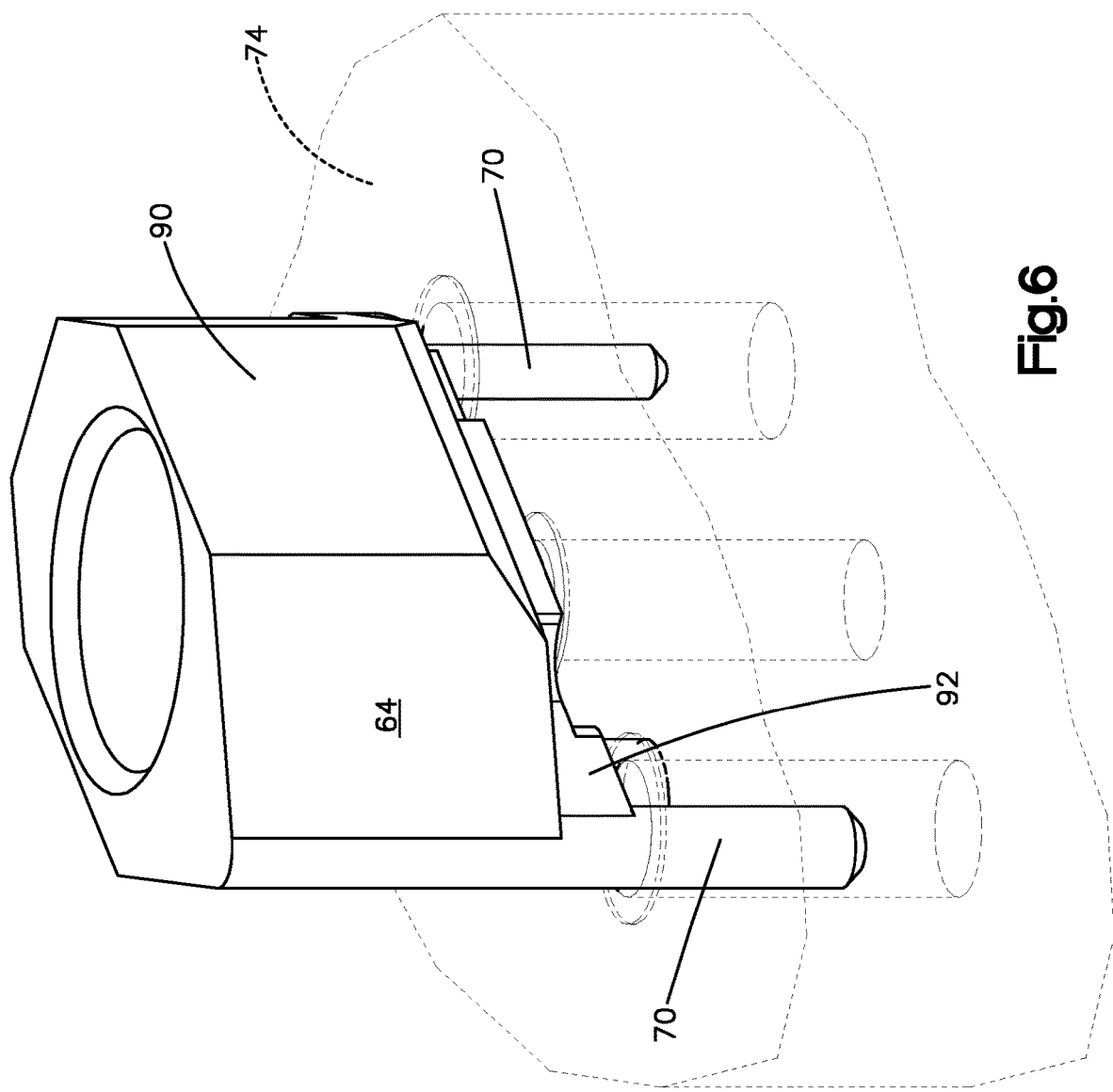
FIG. 6 is a perspective end view of a second RF ground structure mounting end of a second RF ground structure.

Referring to FIG. 6, second RF ground structure mounting end 90 of the second RF ground structure 64 can define at least one through hole mount pegs 70, such as a plurality of through hold mount pegs 70, that can each be received in a substrate 74. In one example, the second RF ground structure 64 can include one, at least one, two, at least two, three, at least three, four, and at least four through hole mount pegs 70 that can each be received in a substrate 74. The second RF ground structure 64 can be right angle or vertical. At least one standoff or wing 92, such as a plurality of standoffs or wings 92, can extend from a body of the ground structure 64 and can face and can be mounted to the substrate 74, such that the body is spaced from the substrate 74.

FIGS. 7A and 7B each show the second RF connector conductor mount end 62, second RF ground structure 64, through hole mount pegs 70, second RF ground structure mounting end 90, standoffs or wings 92, and an extension or extensions 94. The through hole mount pegs 70 can each have the same outer diameters, or different outer diameters, such as approximately 15 mils (0.38 mm) and approximately 10 mils (0.25 mm), respectively. The through hole mount pegs 70 can be spaced apart on approximate 120 mil (3.05 mm) centers, or other suitable centerline spacings. Second RF connector conductor mount end 62 can be positioned adjacent to a single through hole mount peg 70 or between spaced apart through hole mount pegs 70. Standoffs 92 can be defined by or positioned adjacent to the extension 94, and can be configured to be positioned between the substrate 74 and the extension 94, second RF ground structure 64, or both.

The unitary or segmented extension 94 can be positioned on one side of a respective standoff 92, and can define a hole that the second RF connector conductor mount end 62 can pass through without physically contacting the extension 94. Each extension or extensions 94 can have an extension thickness of approximately 12 mils (0.30 mm). The extension 94 can extend between the through hole mount pegs 70. One or more through hole mount pegs 70 can extend from the extension 94.

As shown in FIG. 8, each standoff or wing 92 can have a standoff height of approximately 6 mils (0.15 mm), and a standoff length of approximately 25 mils (0.64 mm). Adjusting the standoff height and/or the standoff length of the standoffs 92 can tune impedance control and can increase the useable bandwidth.

FIG. 9 shows a second RF ground structure mounting end 90 of the second RF ground structure 64 mounted to a substrate 74. Each standoff or wing 92 can be elongated along a line that passes through the two opposed standoffs 92, the two opposed though hole mount pegs 70, and the second RF connector conductor mount end 62. A standoff 92 can sit on a corresponding, elongated ground or reference pad 96. Each standoff 92 can be soldered to a corresponding, elongated ground or reference pad 96. Each elongated ground or reference pad 96 can, in turn, allow each standoff 92 to be longer in length along the line to a corresponding edge of an elongated ground or reference pad 96 for better insertion loss improvement. The standoffs 92 can provide a shorter path distance from a center of a respective ground/through hole mount peg 70, towards signal pin, while simultaneously acting as a body standoff.

Figure 10:
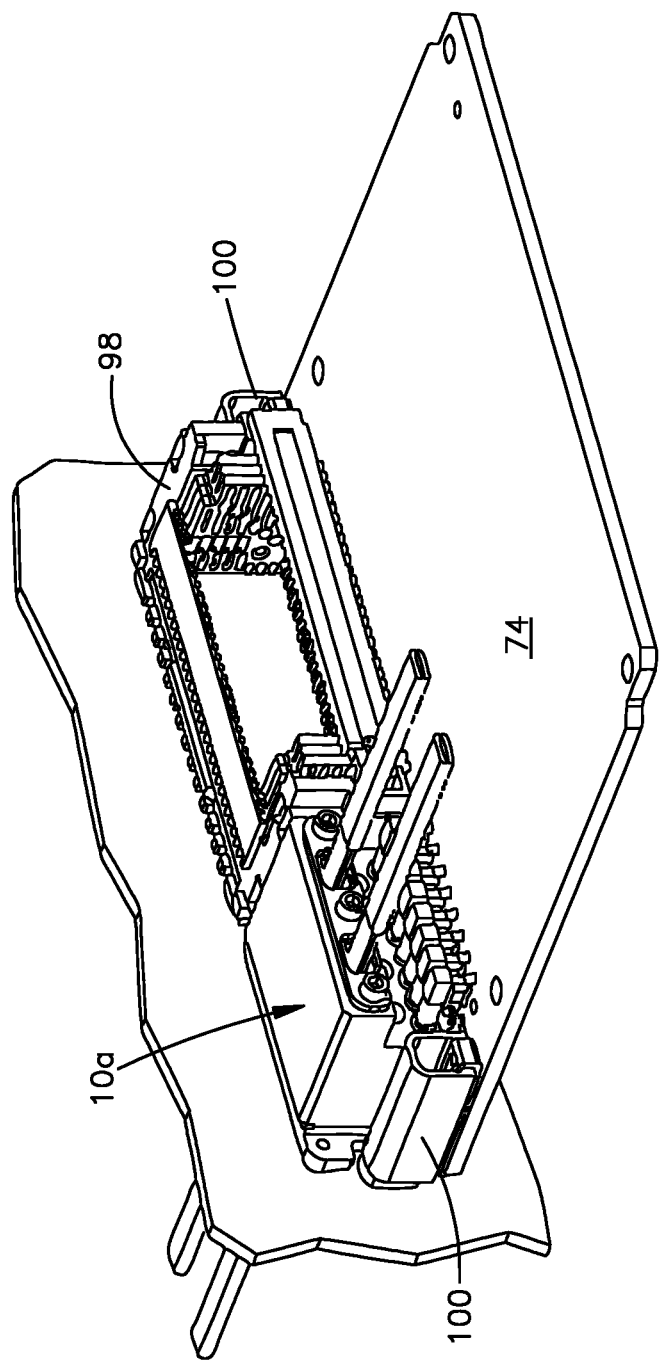
FIG. 10 is a perspective side view of one half of a connector system.
Figure 11:
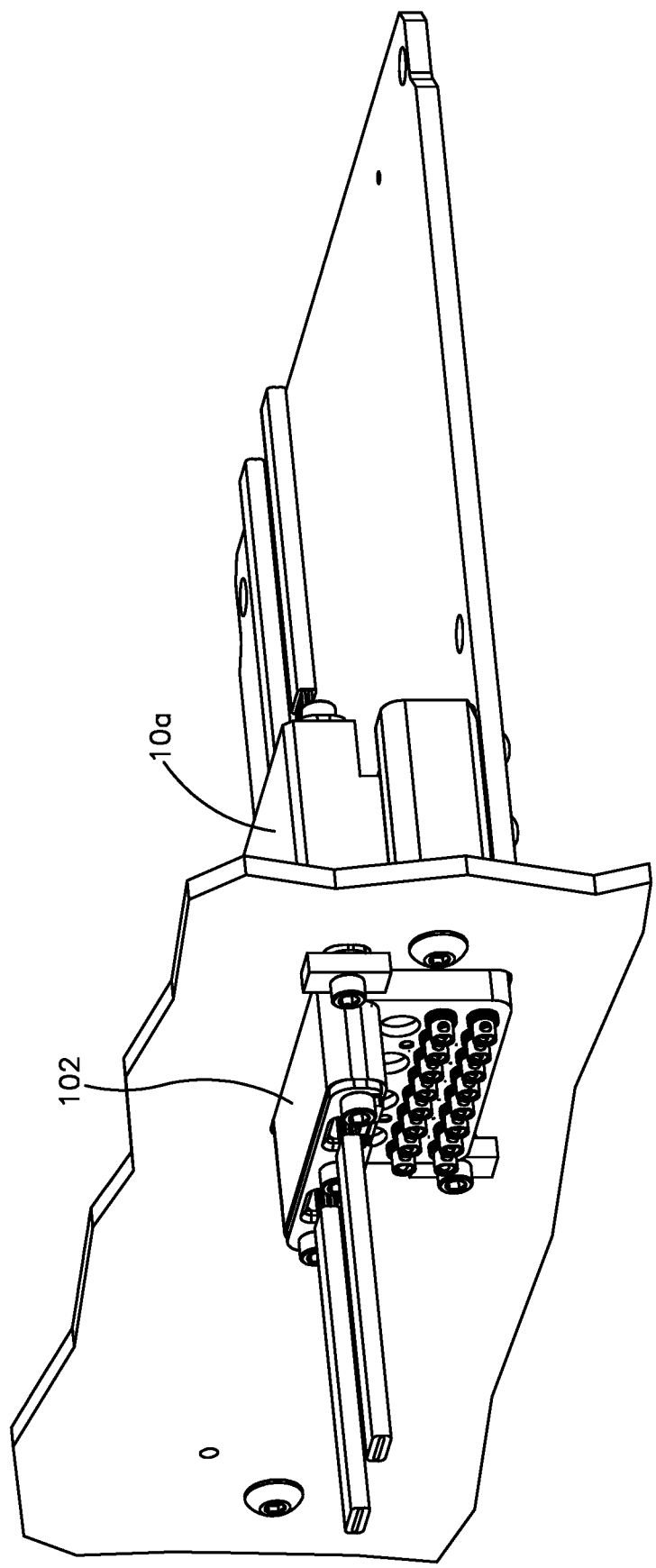
FIG. 11 is an opposite perspective side view showing the other half the connector system shown in FIG. 10.

FIG. 10 is a perspective top view of a connector 10A, a right angle connector 98 partially populated with insert molded leadframe assemblies, such as a SEARAY or ACCELERATE brand right angle connector sold by Samtec, Inc., and guidance receptacles 100. FIG. 11 is a perspective side view of a mating connector 102 that is configured to mate with the connector 10A.

Figure 12:
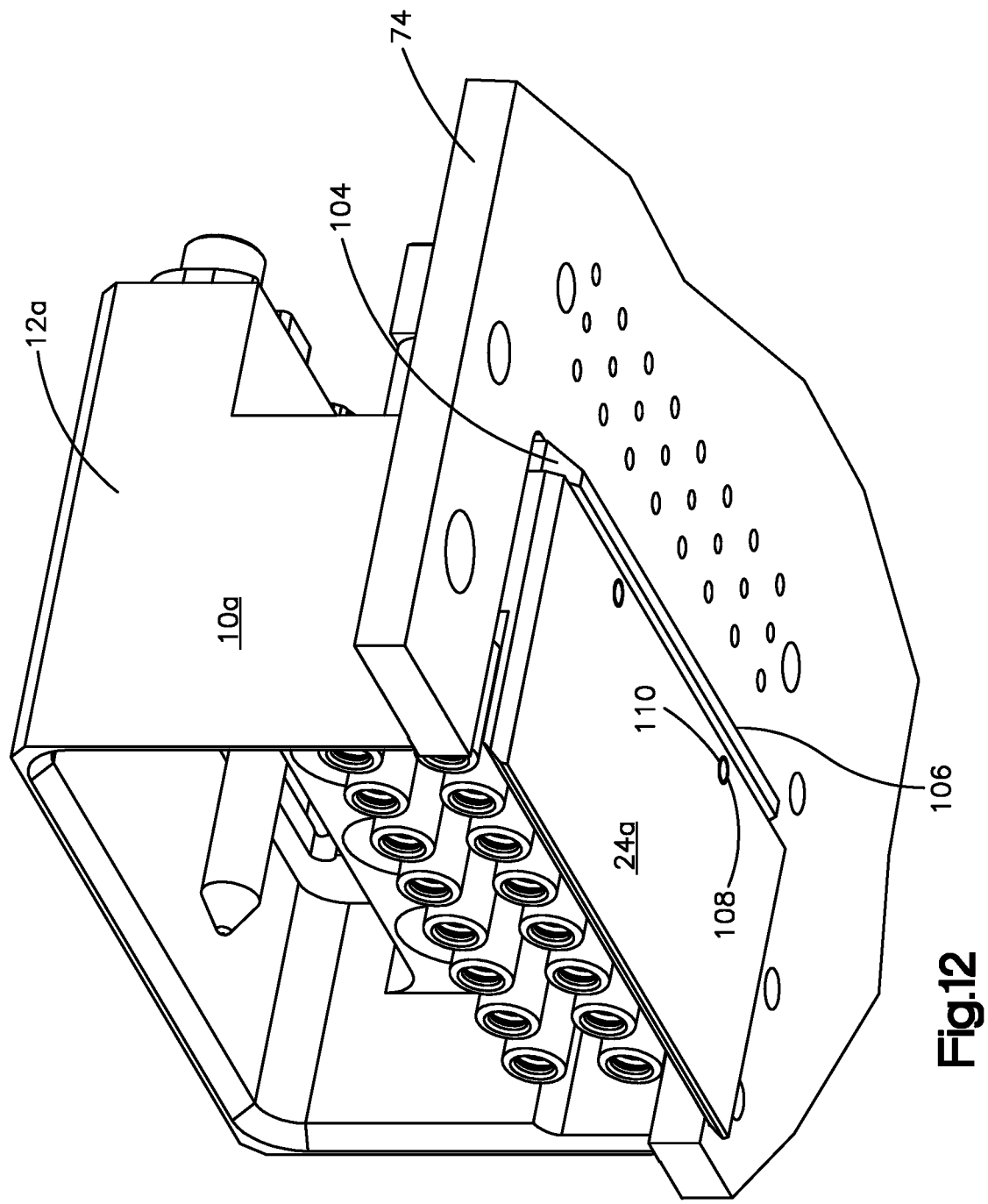
FIG. 12 is perspective bottom view of a second embodiment connector mounted on a substrate.

One difference between connector 10 and connector 10A, as first shown in FIG. 12, is that the connector 10A can include a bias block 104 that is supported by a connector body 12A of the connector 10A. For instance the bias block 104 can be attached to the connector body 12A or can be monolithic with the connector body 12A. The bias block 104 can define a leading edge 106. In general, the leading edge 106 can provide a ramp that a substrate leading edge LE can slide upon. One or more stop pins 108 can extend into a respective one of connector body holes 110 that can be defined by the sixth side 24A of the connector body 12A. The one or more stop pins 108 can be fixed with respect to the connector body 12A. The bias block 104 can move independently of the one or more stop pins 108.

Figure 13:
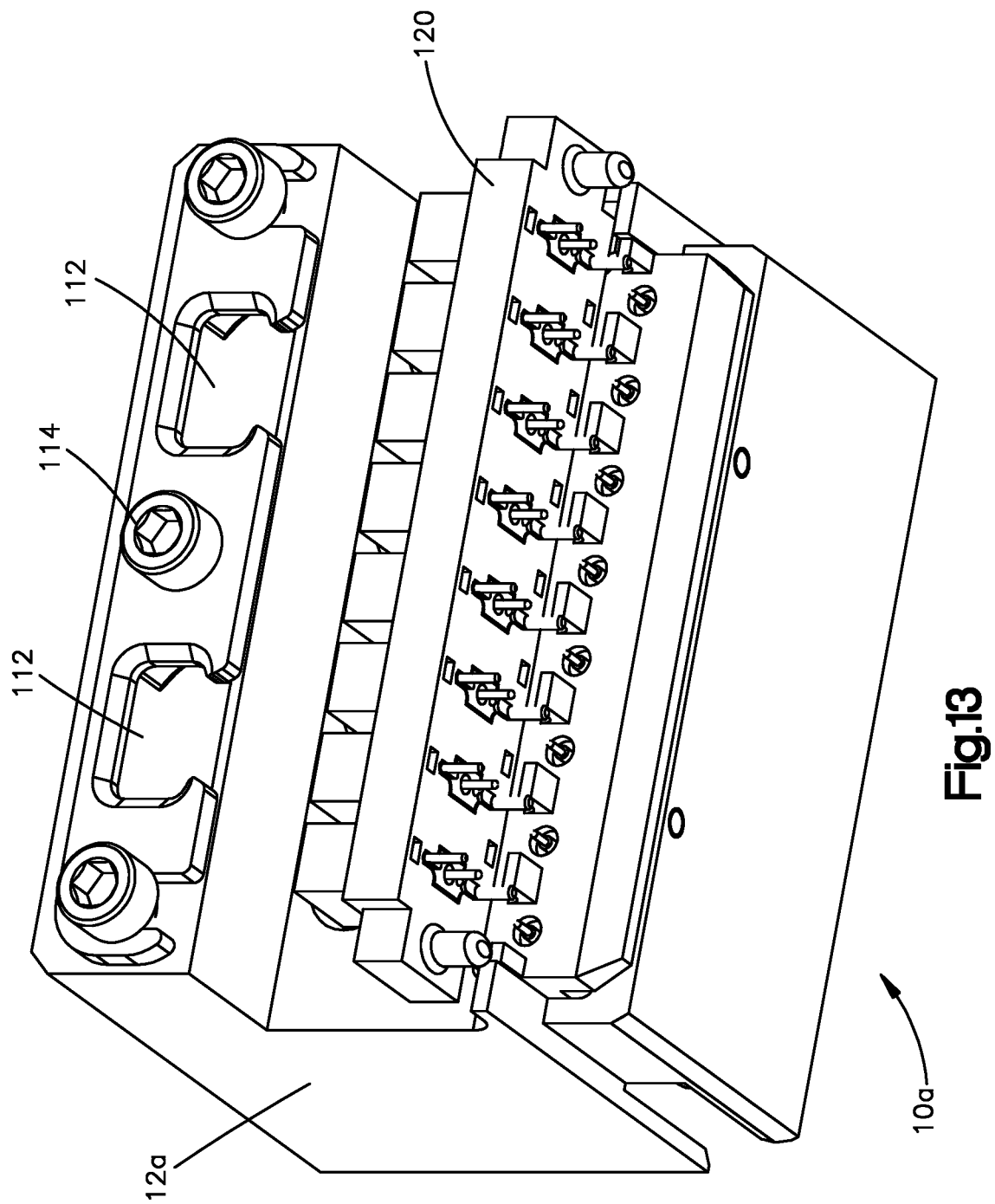
FIG. 13 is perspective end view of the second embodiment connector shown in FIG. 12, with the substrate removed.

As shown in FIG. 13, there can be other differences between connector 10 and connector 10A. Connector 10A, connector body 12A or both can include at least two openings 112 that each can be respectively configured to removably receive a corresponding optical cable connector (not shown). Connector 10A can include a guide pin or guide opening 114 positioned between the at least two openings 112 and between the corresponding optical cable connectors or ferrules. Connector 10A can include a RF tail organizer 120 that can be configured to provide rough alignment of respective through hole mount pegs 70 with a substrate. The connector 10A can otherwise be configured as described herein with respect to the connector 10.

Figure 14:
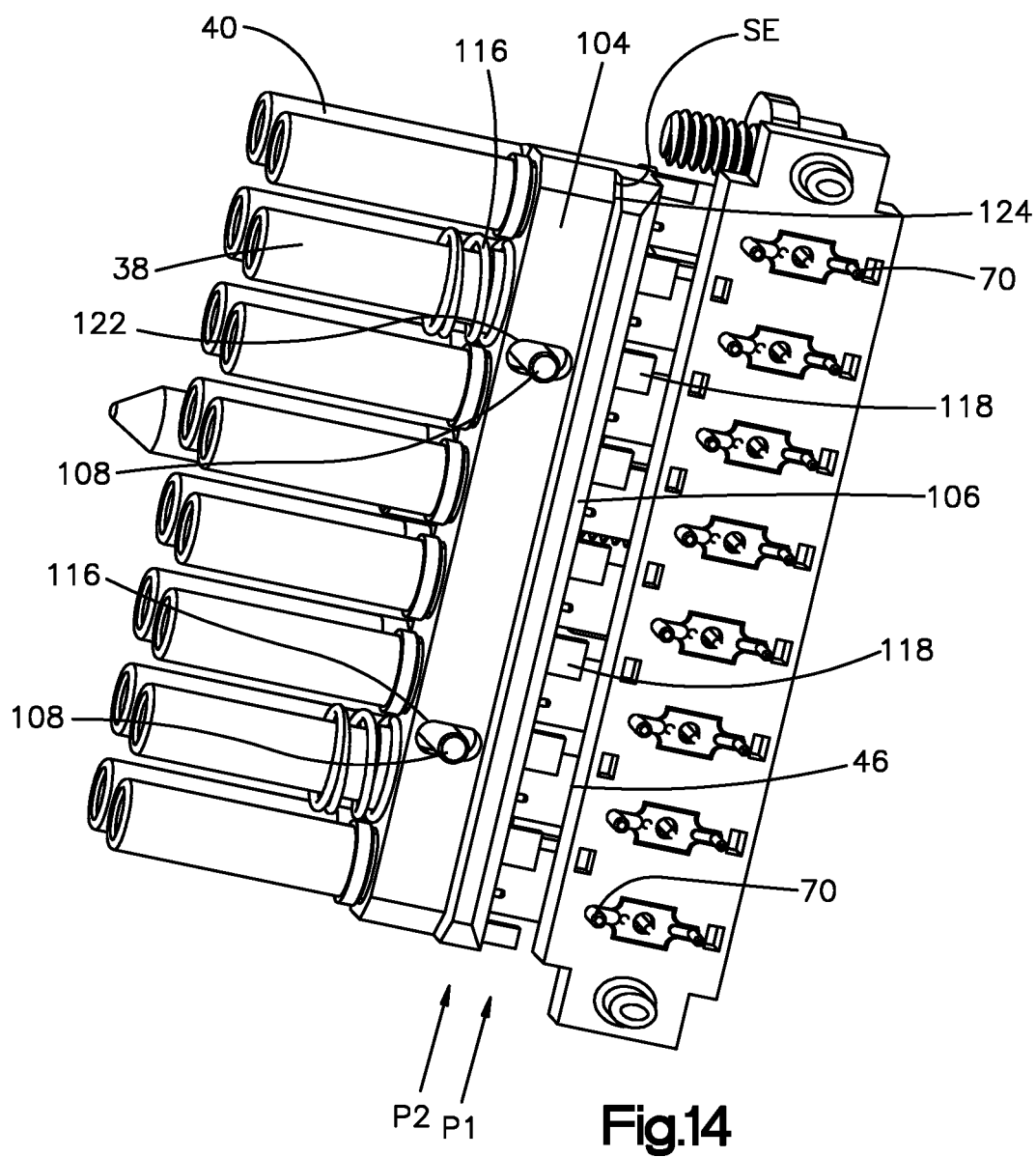
FIG. 14 is a perspective end view the second embodiment connector shown in FIG. 13 with the connector body removed.

The bias block 104 is now discussed in greater detail. Referring to FIG. 14, bias block 104 can be made from a metal or other electrically conductive material. The bias block 104 can be biased in mating direction, such as direction toward the through hole mount pegs 70. Biasing can be done by any suitable biasing member such as springs 116, coil springs, expansion springs, or the like. The biasing member can bias the bias block 104 toward and against the substrate 74 so as to align the substrate 74 with the mount ends of the first and second RF connectors 38 and 40. In one example, one or more springs 116 can be positioned around or adjacent to a respective first RF connector 38 or second RF connector 40, and can bias the bias block 104 toward and against the substrate 74. Each spring 116 can be compressed between the connector body 12A (FIG. 13) and the bias block 104. The bias block 104 can define one or more block solder tabs 118 that can be configured to be configured to be soldered to a substrate or corresponding ground pads on a substrate. The bias block 104 can define one or more respective bias block holes 122. One or more of the bias block holes 122 can be non-circular in shape or have an external perimeter that defines an ellipse or other structure with two opposed sides that are longer than two opposed ends. The bias block holes 122 can each have an inner perimeter that is larger than the outer diameter of a respective stop pin 108, such that there is some constrained movement of the bias block 104 by the stop pin 108. In one example, the bias block holes 122 define elongate slots. The slots can be elongate along a direction of motion of the bias block 104 toward the substrate 74, such that the stop pins 108 is movable within the slots, respectively, as the bias block 104 travels in a direction against the substrate 74.

Figure 14A:
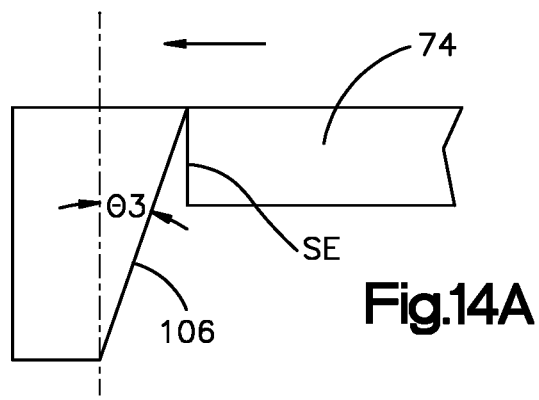
FIG. 14A is a schematic side view of the second embodiment connector being mounted onto a substrate.

In operation, as shown schematic diagram FIG. 14A, the leading face or edge 106 of the bias block 104 can define a third angle θ3 or chamfer or taper. When the connector 10A is mounted to a corresponding substrate 74, the leading edge 106 of the bias block 104 can ride along or engage a substrate edge SE of a corresponding substrate 74 under the force of the biasing member. The biasing block 104 can move in the direction of the arrow, while the through hole mount pegs 70 remain fixed with respect to a mounting substrate.

Referring again to FIG. 14, the biasing block 104 can move in a direction opposite to the mating direction, such as from first position P1 to second position P2. This movement can cause the springs 116 to compress. Once the bias block 104 is partially or fully compressed, a bias block seat 124 can engage the substrate edge SE of the substrate 74. At this point, the bias block 104 can be held tightly, semi-permanently or permanently against the substrate edge SE of the substrate 74. The bias block 104 can eliminate a gap, such an air gap, between the bias block 104 and the substrate edge SE of the substrate 74. This greatly improves RF signal integrity performance, particularly near the first RF connector conductor mount ends 46.

As shown in FIG. 15, the biasing block 104 can also pull or simultaneously pull at least one, at least two, at least three, or at least four of the at least four through hole mount pegs 70 tightly in physical, electrical or physical and electrical engagement with the inside of a corresponding inner via wall 126. In particular, one of the through hole mount pegs 70 with a larger width or diameter, such as the 15 mm through hole mount peg 70, can be positioned in a through hole via 128 defined by the substrate 74. The through hole via 128 that is configured to receive a corresponding one of a through hole mount peg 70 of a corresponding second RF ground structure 64 can be closer in distance to the leading edge 106 of the bias block 104 than an opposed through via hole 128A that is configured to receive another or the other opposed through hole mount peg 70A of the same second RF ground structure 64. FIG. 16 shows a bias block 104 attached to a substrate 74 or ground pads or ground traces on a substrate 74 by block solder tabs 118.

In partial summary, a connector 10, 10A can include a connector body 12, 12A, and a bias block 104. The bias block 104 can be spring loaded and manually or automatically seat against a substrate edge SE of a substrate 74. A spring loaded bias block 104 fills in any air gaps between the bias block 104 and the substrate 74. The bias block 104 can push on or against a substrate edge SE of a substrate 74, and pull or simultaneously pull a through hole mount peg 70 against an inner via wall 126 of a through hole via 128 prior to soldering. This helps with alignment and true positioning of the first and second RF connectors 38, 40 and their respective first RF connector conductor mount ends 46 and second RF connector conductor mount ends 62 on respective substrate pads. The connector can include first and second RF ground structures 48, 64. Second RF ground structure 64 can include standoffs or wings 92, an internal, angled transition region 80A, or both, in combination with the bias block 104. The connector can also include at least two optical ferrules and a guide pin or guide opening 114 positioned between the at least two optical ferrules.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure is not limited to the particular embodiments disclosed for carrying out this disclosure, but that the disclosure will include all embodiments falling within the scope of the appended claims.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. The term "approximately" and "substantially" as used herein with respect to a distance, size, shape, dimension, angle, or other parameter includes the stated distance, size, shape, dimension, angle, or other parameter as well as up to 10% greater and less than of the distance, size, shape, dimension, angle, or other parameter, including up to 9% greater and less than of the distance, size, shape, dimension, angle, or other parameter, including up to 8% greater and less than of the distance, size, shape, dimension, angle, or other parameter, including up to 7% greater and less than of the distance, size, shape, dimension, angle, or other parameter, including up to 6% greater and less than of the distance, size, shape, dimension, angle, or other parameter, including up to 5% greater and less than of the distance, size, shape, dimension, angle, or other parameter, including up to 4% greater and less than of the distance, size, shape, dimension, angle, or other parameter, including up to 3% greater and less than of the distance, size, shape, dimension, angle, or other parameter, including up to 2% greater and less than of the distance, size, shape, dimension, angle, or other parameter, including up to 1% greater and less than of the distance, size, shape, dimension, angle, or other parameter. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. A connector comprising:
a connector body having a first side and a second side, the second side defining a hollow extension that is fluidly connected to a connector orifice defined by the first side and is configured to receive an optical cable connector, the first side and the second side defining at least one first RF connector orifice and the first side and the second side defining at least one second RF connector orifice,
a first RF connector inserted in the at least one first RF connector orifice from first side of the connector body, in a direction toward the opposed second side of the connector body, the first RF connector configured to be mounted to a substrate;
a second RF connector inserted in the at least one second RF connector orifice from the second side of the connector body, in a direction toward the opposed second side of the connector body, the second RF connector configured to be mounted to the substrate; and
a bias block that is supported by the connector housing and is biased against the substrate so as to align the substrate with respective mount ends of the first and second RF connectors.

2. The connector of claim 1, further comprising protrusions that alternate along a common line along the second side of the connector body.

3. The connector of claim 1, wherein the first RF connector comprises a first RF connector conductor that, in turn, comprises a first RF connector conductor mate end and a first RF connector conductor mount end, and the first RF connector conductor mount end defines a surface mount tab.

4. The connector of claim 1, wherein the second RF connector further comprises a second RF connector conductor that, in turn, comprises a second RF connector conductor mate end and a second RF connector conductor mount end.

5. The connector of claim 4, wherein the second RF connector conductor bends at an angle at a location along its entire length.

6. The connector of claim 1, wherein the at least one first RF connector further comprises a first RF ground structure.

7. The connector of claim 6, wherein the first RF ground structure encircles or surrounds a majority length of the first RF connector conductor.

8. The connector of claim 6, wherein the at least one second RF connector further comprises a second RF ground structure.

9. The connector of claim 8, wherein the second RF ground structure encircles or surrounds a majority length of the second RF connector conductor.

10. The connector of claim 1, wherein the second RF connector further comprises through hole mount pegs.

11. The connector of claim 1, wherein the second side defines at least one third RF connector orifice.

12. The connector of claim 1, wherein the bias block is spring loaded.

13. The connector of claim 1, wherein the bias block seats against a substrate edge of a substrate.

14. The connector of claim 1, wherein the bias block pushes on a substrate edge of a substrate, and pulls a through hole mount peg against an inner via wall of a through hole via.

15. The connector of claim 1, comprising a pin that is movable within an opening as the bias block travels in a direction against the substrate.

16. A connector comprising:
a connector body having a first side and a second side, a first type of connector inserted into the connector body from the first side, a second type of connector inserted into the connector body from a second side, opposite to the first side, and a third type of connector inserted into the connector body from the second side, opposite to the first side,
wherein 1) the first type of connector is a first RF connector that includes a first RF connector conductor, 2) the first RF connector conductor includes a first RF connector conductor mate end and a first RF connector conductor mount end, the first RF connector conductor mount end positioned between two spaced apart protrusions defined by the second side of connector body, and 3) the second type of connector is a second RF connector that includes a second RF connector conductor, the second RF connector conductor having a second RF connector conductor mate end and a second RF connector conductor mount end, where the second RF connector mount end is spaced farther from the first side than the first RF connector mount end and the third type of connector being an optical cable connector.

17. The connector of claim 16, further comprising a bias block.

18. The connector of claim 17, wherein the bias block is spring loaded.

19. The connector of claim 17, wherein the bias block seats against a substrate edge of a substrate.

20. The connector of claim 17, wherein the bias block pushes on a substrate edge of a substrate, and pulls a through hole mount peg against an inner via wall of a through hole via.

21. The connector of claim 16, wherein the first RF connector conductor mount end comprises a surface mount tab, and the second RF connector mount end comprises a through hole mount peg or press-fit tail.

22. The connector of claim 21, wherein the second RF connector mount end comprises two or more through hole mount pegs or press-fit tails.

23. An RF connector comprising:
an RF connector ground structure that includes an RF ground structure mounting end, and at least one through hole mount peg configured to be received in a substrate; and
at least one standoff that extends from a body of the RF connector ground structure and configured to be mounted to corresponding ground pads on the substrate, such that the body is spaced from the substrate, wherein the standoff includes a first portion that extends out from the body of the RF connector ground structure, and a second portion that extends from the first portion along a direction of elongation, the second portion configured to sit on a corresponding pad of the substrate, wherein the direction of elongation is along a straight line that passes through the through hole mount peg.

24. The RF connector of claim 23, further comprising an extension positioned on one side of a respective standoff.

25. The RF connector of claim 24, wherein the extension defines a hole that a second RF connector conductor mount end can pass through without physically contacting the extension.

26. The RF connector of claim 23, wherein the straight line further passes through the RF ground structure mounting end.

* * * * *